United States Patent
Yao et al.

(10) Patent No.: US 11,864,256 B2
(45) Date of Patent: Jan. 2, 2024

(54) END-TO-END OVERWATCH OF COMMUNICATION SESSIONS IN A WIRELESS COMMUNICATION NETWORK FOR FAST FAILURE RECOVERY

(71) Applicant: DISH Wireless L.L.C., Englewood, CO (US)

(72) Inventors: Kevin Yao, Cheyenne, WY (US); Prashant Raghuvanshi, Parker, CO (US)

(73) Assignee: DISH Wireless L.L.C., Littleton, CO (US)

( * ) Notice: Subject to any disclaimer, the term of this patent is extended or adjusted under 35 U.S.C. 154(b) by 228 days.

(21) Appl. No.: 17/407,513

(22) Filed: Aug. 20, 2021

(65) Prior Publication Data

US 2023/0055658 A1    Feb. 23, 2023

(51) Int. Cl.
| | |
|---|---|
| *H04W 76/19* | (2018.01) |
| *H04L 67/568* | (2022.01) |
| *H04W 24/08* | (2009.01) |

(52) U.S. Cl.
CPC .......... *H04W 76/19* (2018.02); *H04L 67/568* (2022.05); *H04W 24/08* (2013.01)

(58) Field of Classification Search
CPC .... H04W 76/19; H04W 24/08; H04L 67/568; H04L 67/14; H04L 69/40
See application file for complete search history.

(56) References Cited

U.S. PATENT DOCUMENTS

| | | | |
|---|---|---|---|
| 7,539,127 B1 | 5/2009 | Shaffer et al. | |
| 10,659,427 B1* | 5/2020 | Ratcliffe | ............. H04L 61/4552 |
| 2013/0311825 A1 | 11/2013 | Brunson Gordon et al. | |
| 2016/0286597 A1* | 9/2016 | Eriksson | ............... H04W 76/19 |
| 2017/0310755 A1* | 10/2017 | Hoernes | ............. H04L 41/0853 |

OTHER PUBLICATIONS

International Search Report and Written Opinion for PCT/US2022/040846 dated Dec. 6, 2022, all pages.

* cited by examiner

*Primary Examiner* — Hassan Kizou
*Assistant Examiner* — Hector Reyes
(74) *Attorney, Agent, or Firm* — KILPATRICK TOWNSEND & STOCKTON LLP

(57) ABSTRACT

Techniques are described for end-to-end overwatch of communication sessions in a network for fast failure recovery. At any time, network functions (NFs) can be supporting end-to-end connectivity for large numbers of concurrent active communication sessions. Conventionally, if one or more of the NFs fail, session context information can be irretrievably lost, and session connectivity is lost. Embodiments provide an overwatch system in an overwatch plane of the network to determine critical session context dataset (CSCDs) for NFs participating in active communication sessions, and to continuously take snapshots of the entire end-to-end context of active communication sessions in accordance with the CSCDs and endpoint information for the NFs. In the event of a session failure, embodiments generate recovery data from the recorded end-to-end context data, which can be used to rapidly restore full, end-to-end session connectivity, thereby maintaining the active communication session without a loss of session context.

20 Claims, 5 Drawing Sheets

END-TO-END OVERWATCH OF COMMUNICATION SESSIONS IN A WIRELESS COMMUNICATION NETWORK FOR FAST FAILURE RECOVERY

FIELD OF THE INVENTION

Embodiments generally relate to wireless communication networks, and, more particularly, to end-to-end overwatch of communication sessions in a wireless communication network for fast failure recovery.

BACKGROUND OF THE INVENTION

A primary function of communication networks is to provide communication services to end users via their respective communication devices, such as smart phones, computers, and other network-connected devices. Some such communication services involve establishing and maintaining "sessions" (e.g., protocol data unit (PDU) sessions) to support phone calls, video calls, messaging, etc. Each active session seeks to maintain end-to-end connectivity between one or more end user devices and one or more data networks via one or more network functions (NFs), or user plane functions (UPFs). In some modern communication networks, some or all of the NFs are implemented as virtualized nodes, such as by a corresponding virtual machine (VM). VMs can be stateful (i.e., they maintain their own state information in a database typically running in a same codebase, or the like), or stateless.

Thus, during any particular active session, a set of NFs can be working together to maintain the session connectivity. To that end, the set of NFs generate and share large amounts of context data (e.g., hundreds of lines of such data) to help define how each NF can carry out its respective role in maintaining the session connectivity in accordance with one or more communication protocols. If any of the set of NFs fails, end-to-end connectivity can be lost, and the entire session can be dropped. Communication protocols typically include techniques for automatically attempting to reestablish the dropped session. For example, a particular instance of a particular type of NF may maintain its own context data in its own database; if the particular instance fails in a manner that leaves its database intact, a protocol may define a procedure by which the stored context data can be handed over to another instance of the same type of NF to maintain the session.

However, in some cases, it is not possible to recover the context information of a failed NF (e.g., the database also fails), and/or the information cannot be recovered or reconstructed quickly enough to avoid dropping the entire session. Similarly, if a regional data center, or other major network hub fails, even for a very short time, large numbers of active sessions passing through that hub may concurrently be dropped. Recovering from such a failure would be impracticable, likely involving reconstructing huge amounts of context data by individually querying large numbers of distributed NFs that were potentially participating in those sessions, all within short timeout windows. In such cases, sessions would likely be dropped, resulting in dropped calls, text messages failing to be delivered, etc. Typically, in such cases, either the network would attempt automatically to establish new sessions for impacted end users (e.g., to reconnect a call, resend a text message, etc.; or end users would be forced to manually reestablish a new session, such as by attempting to re-call another end user, to resend a text message, etc. Conventional communication networks tend to be unable automatically to recover from such failures rapidly and efficiently enough to maintain active sessions.

SUMMARY OF THE INVENTION

Embodiments described herein provide techniques for end-to-end overwatch of communication sessions in a wireless communication network for fast failure recovery. At any time, network functions (NFs) of a communication network can be supporting end-to-end connectivity for large numbers of concurrent active communication sessions. Conventionally, if one or more of the NFs fail, session context information can be irretrievably lost, and session connectivity is lost. Embodiments provide an overwatch system in an overwatch plane of the network to determine critical session context dataset (CSCDs) for NFs participating in active communication sessions, and to continuously take snapshots of the entire end-to-end context of active communication sessions in accordance with the CSCDs and endpoint information for the NFs. In the event of a session failure, embodiments generate recovery data from the recorded end-to-end context data, which can be used to rapidly restore full, end-to-end session connectivity, thereby maintaining the active communication session without a loss of session context.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION OF THE INVENTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
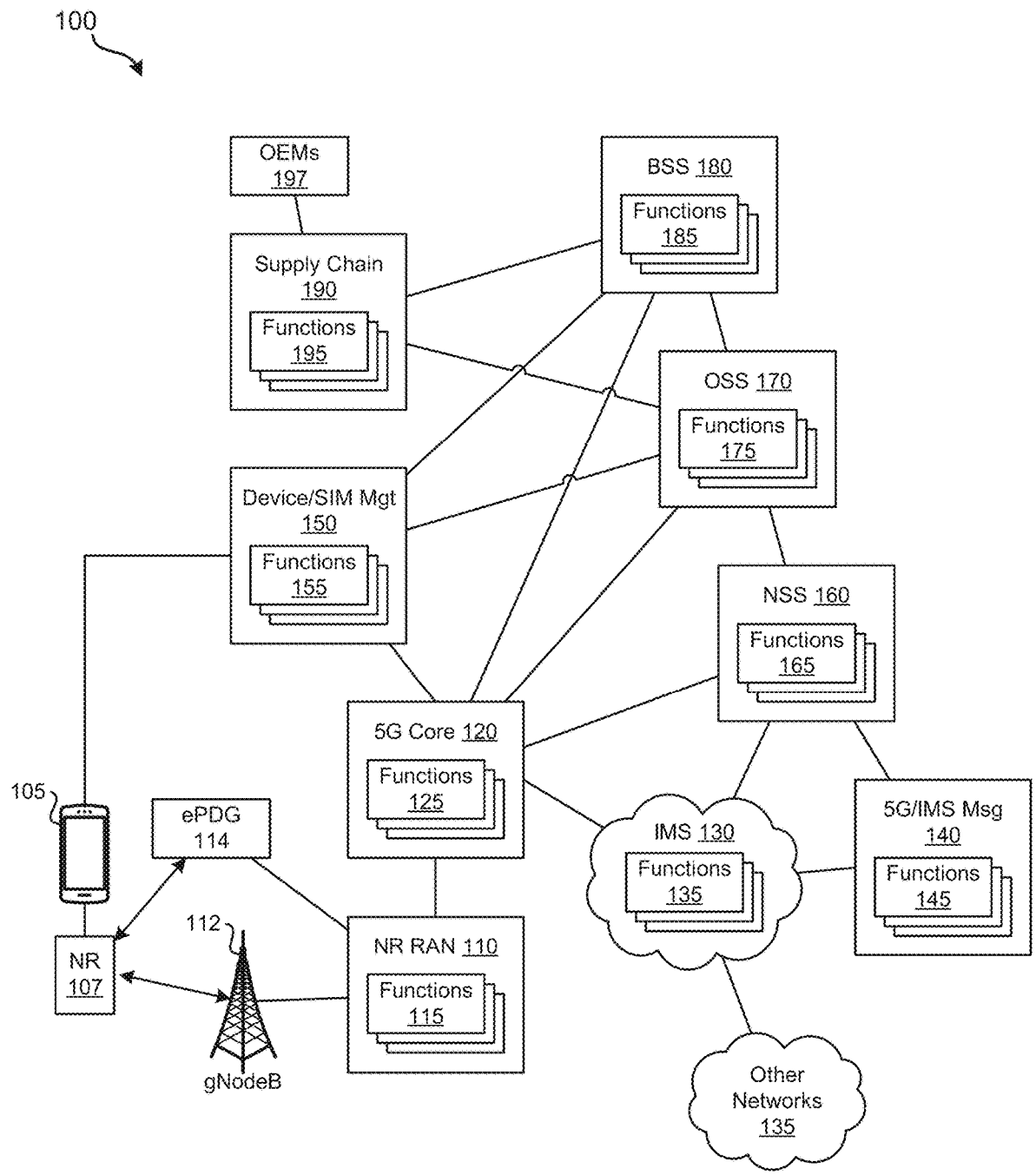
FIG. 1 shows an example of a conventional wireless communication network architecture, as context for various embodiments described herein.

FIG. 1 shows an example of a conventional wireless communication network architecture 100, as context for various embodiments described herein. The conventional wireless communication network architecture 100 can represent a portion of a modern, wireless network that may be used to carry out multiple types of communication sessions, such as voice calls, video calls, messaging (e.g., Short Message Service (SMS) messaging, Multimedia Messaging Service (MMS) messaging, group messaging, etc.), and/or other types of communications. As illustrated, the architecture 100 is complex with a very large number of diverse types of network functions (NFs). Many of the network functions can be virtualized, such as by implementing them in a cloud-native architecture. Further, some or all portions of the architecture 100 can be disaggregated, such that network functions are developed, deployed, and/or operated by multiple vendors and/or operators. In such an architecture 100, many network functions have dynamically changing characteristics, and overall network characteristics (e.g., state) can be highly dynamic with constant and rapid changes in network resource availability, network resource demands, environmental factors, etc.

The illustrated conventional network architecture 100 can represent a portion of a modern, wireless network built around "fifth generation" (5G) standards promulgated by standards setting organizations under the umbrella of the Third Generation Partnership Project (3GPP). While certain aspects are described with relation to a 5G network, techniques described herein can similarly be applied to other types of communication networks, such as a third generation (3G) network, fourth generation (4G) Long-Term Evolution (LTE) network, etc. For the sake of illustration, a user equipment (UE) device 105, such as a smartphone, is shown as deploying a so-called "new radio" (NR) 107 designed to communicate with a NR radio access network (RAN) 110 of the 5G network. The NR 107 can communicate with the NR RAN 110 in various ways, such as via an evolved packet data gateway (ePDG) 114, a so-called "gNodeB" or "gNb" 117 (a 3GPP 5G next-generation base station to supports the 5G NR 107), or other radio unit (RU).

The NR RAN 110 (or "Next Generation RAN") can enclose a future-proof software offering that co-exists with deployed long-term evolution (LTE) networks and smoothly prepares the migration from LTE to NR. Some evolved networks are beginning to deploy the NR RAN 110 as a disaggregated RAN (referred to as an "Open RAN," or "O-RAN") which can include hierarchy (e.g., tree structure) of RAN functions 115. For example, each of multiple centralized units (CUs) is coupled with multiple distributed units (DU), and each DU is coupled with multiple RUs. As such, each NR 107 can communicate with a backhaul network infrastructure (e.g., the 5G Core 120) according to an assigned communication path through a particular RU, DU, and CU. The NR RAN 110 can include additional RAN functions 115, such as a real-time RAN intelligent controller (RIC), a non-real-time RIC, etc.

The 5G Core 120 can generally include a number of core functions 125, such as a Home Subscriber Server (HSS), which can be a main database of a current generation cellular communications system; an Equipment Identity Register (EIR) function; a policy control function (PCF), which can apply session policies for the UE 105, or other devices when connecting over 4G or 5G; a Unified Data Management (UDM) function, which can manage network user data in a single, centralized element, and can be similar to the HSS in a cloud-native implementation designed specifically for 5G; a User Plane Function (UPF), which can perform user plane operations, like maintaining protocol data unit (PDU) sessions, packet routing and forwarding, packet inspection, policy enforcement for the user plane, quality of service (QoS) handling, etc.; a Network Repository Function (NRF); a Network Exposure Function (NEF), which can expose services and resources over application programming interfaces (APIs) within and outside the 5G Core 120), a Network Slice Selection Function (NSSF), which can provide tailor made logical networks on the physical network; an Authentication Server Function (AUSF); a Location Management Function (LMF); a Gateway Mobile Location Center (GMLC) function; an Access and Mobility Management Function (AMF), which can perform operations like mobility management, registration management, connection management, UE-based authentication, etc.; a Session Management Function (SMF), which can perform internet protocol (IP) address allocation and management for UEs 105, user plane selection, and packet routing in conjunction with the UPF; etc.

Behind the 5G core 120, the network architecture 100 can include many different types of functional subsystems, such as an IP Multimedia Subsystem (IMS) 130, a 5G-IMS Messaging Subsystem 140, a Device and Subscriber Identification Module (SIM) ("Device/SIM") Management Subsystem 150, a Network Service Systems (NSS) Subsystem 160, an Operation Support Systems (OSS) Subsystem 170, a Business Support Systems (BSS) Subsystem 180, a Supply Chain Subsystem 190, etc.

The IMS 130 can include various IMS functions 135, such as a Proxy Call Session Control Function (P-CSCF), which can behave as a session initiation protocol (SIP) proxy by forwarding SIP messages between the UE 105 and the 5G Core 120; an Interrogating Call Session Control Function (I-CSCF), which can interrogate the HSS to determine to which suitable Call Session Control Function (CSCF) to route the request for registration; a Serving Call Session Control Function (S-CSCF), which can provide session set-up, provide session tear-down, provide session control and routing functions, generate records for billing purposes for all sessions under its control, etc.; an Emergency Call Routing (ECR) function; a Breakout Gateway Control Function (BGCF), which can be responsible for determining the next hop for routing of SIP messages; a Media Gateway Control Function (MGCF), which can be used to interact with a public switched telephone network (PSTN); an IMS Media Gateway (IMS-MGW), which can handle voice functions, such as by making protocol translations to support a voice call; a Session Border Control (SBC) function; an Interconnect Border Control Function (IBCF), which can be an SBC specialized for network-to-network interfaces (NNIs), offers boundary control between various service provider networks, and provides IMS network security in terms of signaling information; a Media Resource Function (MRF); etc.

The 5G/IMS Messaging Subsystem 140 can include various messaging functions 145, such as a Short Message Service Center (SMSC) function, a Multimedia Message Service Center (MMSC) function, a Voicemail function, a Visual Voicemail (VVM) function, a Rich Communications Services Application Server (RCS AS) function, etc. The Device/SIM Management Subsystem 150 can include various Device/SIM Management functions 155, such as an Automatic Device Detection (ADD) function, an Entitlement Server, etc. The NSS Subsystem 160 can include various NSS functions 165, such as a Network Assurance function, a Network Inventory function, a Provisioning and Activation function, Network Slice Composition functions (e.g., including a Network Service Orchestration function, a Network Slice Subnet Management Function (NSSMF), etc.), etc. The OSS Subsystem 170 can include various OSS functions 175, such as a Coverage Management function, a Service Assurance function, a Local Service Management System (LSMS) function (which can be a database with latest location routing number (LRN) information used by local number portability (LNP) for routing), etc. The BSS Subsystem 180 can include various BSS functions 185, such as a Wholesale Platform function, a customer resource management (CRM) function, a billing function, a mediation function, a "Configure, Price, Quote" (CPQ) function, etc. The Supply Chain Subsystem 190 can include a number of supply chain functions 195, such as an Inventory System function, a Forecasting function, a Warehouse Management function, an Asset Tracking function, a Workforce Management function, etc.

In addition to the subsystems and NFs considered to be part of the network architecture 100, there can be a large number of interfaces between the network architecture 100 and external functions. For example, the LSMS function in the OSS Subsystem 170 can interface with one or more Number Portability Administration Centers (NPACs), the IMS Subsystem 130 can support NNIs with multiple external networks 135 (e.g., PSTNs, other IMS networks, voice over IP (VoIP) networks, peering networks, etc.), the GMLC function of the 5G Core 120 can interface with one or more external clients, the Supply Chain subsystem 190 can interface with one or more original equipment manufacturers (OEMs) 197, etc.

Each of the vary large number and diversity of NFs of the network architecture 100 can be considered as an ingress and/or egress point (IEP). Any particular IEP typically operates to output certain network data in a certain data format based on receiving certain network data in a certain data format. In some cases, network data of any particular IEP can be relatively static, such as long-term subscription data relating to a particular subscriber. In other cases, network data of any particular IEP can be highly dynamic, such as network state information for a particular RU in the NR RAN 110. For example, such highly dynamic network data can update at sub-millisecond, or even microsecond speeds. Thus, over the entire network architecture 100, large numbers and varieties of IEPs tend to constantly request and produce large amounts and varieties of data, resulting in highly dynamic characteristics across the network.

As noted above, a primary function of communication networks is to facilitate establishment of communication sessions, such as protocol data unit (PDU) sessions, bearer context sessions, etc. Such communication sessions can maintain end-to-end connectivity to support communications between one or more UEs 105 and the data network via a participating set of the NFs. As used herein, a "participating set of NFs" refers to the subset of all the NFs in the network that are participating in maintaining end-to-end connectivity for the communication session (i.e., removing one of the participating set of NFs would break the end-to-end connectivity and cause the session to drop). For many of the types of NFs that participate in communication sessions, the communication network may include many instances (e.g., virtualized instances) of the NF.

In the case of 5G networks, various standards promulgated by 3GPP inform the network architecture and various NF procedures and services within that architecture. For example, some such standards are detailed in 3GPP Technical Specification (TS) 23.501, titled "System architecture for the 5G System (5GS); Stage 2 (Release 17)"; and 3GPP TS 23.502, titled "Procedures for the 5G System (5GS); Stage 2 (Release 17)." According to such standards and specifications, a NF has a particular processing function in the network, including a defined functional behavior and defined interfaces (e.g., IEPs, endpoint information, etc.). For example, 3GPP TS 23.501 states that an NF can be implemented as a network element on dedicated hardware, as a software instance running on dedicated hardware, as a virtualized function instantiated on a cloud infrastructure or other platform, etc. The same 3GPP TS 23.501 also notes that the network can include multiple identifiable instances of any NF. For example, while the 5G core 120 is described above as including an AMF, the 5G core 120 of a large network (e.g., a nationwide 5G wireless network) may include large numbers of virtualized instances of AMFs, which may be implemented to provide identical functionality, similar functionality, or the like.

As part of an active communication session, one or more UEs 105 communicate with the various backhaul NFs (e.g., via one or more gNodeBs 112 and the NR RAN 110). To effect the end-to-end connectivity, each participating NF generates session context data in accordance with one or more protocols that define the manner in which the NFs handle the communication session (e.g., in 3GPP TS 23.501, 3GPP TS 23.502, etc.). For the sake of illustration, an instance of an AMF may generate at least the following session context data for a particular communication session:

imsi: 111111000000000
    msisdn: 19999999999
    lastAmfUeActivityTimestamp: 3833968099797
    sd: 0x00ABCDEF
    sst: 1
    smCxtRef: /nsmf-pdusession/v1/sm-contexts/01561100
    smfServInstId: 842887ce-329d-4c01-b101-e7dd03faa00
    uecmSrvcInstId: nudm-uecmreg-helm-ch-95c8c-752ei-http2lb-66fc64fd44-s9z2q
    subscriptionId: /nudm-sdm/v2/imsi-111111000000000/sdm-subscriptions/424304cfda1e8ff86e881610a7c9dc90v2

The above-illustrated session context information includes one or more unique identifiers for the UE 105 (e.g., the international mobile subscriber identifier ("imsi") can uniquely identify a physical or virtual subscriber identity module (SIM) card), and the "msisdn" uniquely maps a subscriber's phone number to a mobile device), one or more timestamps (e.g., indicating a last time the AMF context was updated, "lastAmfUeActivityTimestamp"), etc. The session context information can also include links, or pointers to sources of other information, such as to others of the participating NFs. For example, if the protocol dictates that the AMF needs to query an SMF for particular information in a particular circumstance, portions of the AMF's context information may define the address (e.g., uniform resource locator, or the like) used to locate the instance of the SMF participating in the active communication session. For a large communication session, the various participating NFs can generate large amounts (e.g., hundreds of lines) of session context data that are constantly being updated.

Conventionally, each NF may maintain its own portion of the session context data, such as in a database running in its own codebase, or the like. In some cases, such as where a particular NF is conventionally implemented as a virtual machine, such a conventional implementation may include a local snapshot function, or the like, by which the entire state of the particular virtual machine is periodically captured by a local database associated with the virtual machine. Such conventional approaches provide various feature. As one example, if a particular virtualized instance of an NF fails, a previous snapshot of the virtualized instance can be used to restore the NF to a prior state. As another example, if a communication session for a mobile UE 105 involves a particular NF instance, and the mobile UE 105 moves to an area not supported by that NF instance, the particular NF instance can communicate its locally maintained session information to another instance of the same type of NF to effect a handover. However, with such conventional implementations, complete failure of an NF (e.g., including its local database) can cause a loss of at least a portion of the session context information in a manner that is completely, or at least practically unrecoverable, causing a loss of end-to-end connectivity and a dropped communication session. For example, while it may be technically possible to reconstruct the session information by querying large numbers of NFs and stitching together their responses, such reconstruction may be too slow and/or inefficient to practically recover the dropped communication session before components begin to timeout.

As one illustration, if an AMF instance fails while participating in an active communication session in a 5G network, 3GPP protocols define the manner in which to automatically select a replacement AMF instance. In such a case, conventionally, the replacement AMF can essentially receive a new request for a new session, and network can attempt to establish the new connection. In some cases, a pair of end users may experience an ongoing voice or video call being dropped, after which both end users' devices may automatically attempt to reconnect. In other cases, the call is dropped, and both end users may concurrently try manually to reconnect, potentially interfering with each other's attempts. Similarly, an end user's text message may fail to deliver, and the end user may receive an error message from the network stating that the network will automatically attempt to resend the message at a later time, or the end user be forced to re-send the message, etc. In these and other cases, the network effectively may lose the previous session context information, and any further reconnection may involve establishment of a new communication session with new session context information. Such re-establishment of new sessions can manifest undesirable user experiences, burden network resources (e.g., particularly where large numbers of sessions are concurrently dropped), and large number of sessions concurrently try to connect to the network resource increasing burden or congestion on network elements, and/or have other undesirable impacts.

Figure 2:
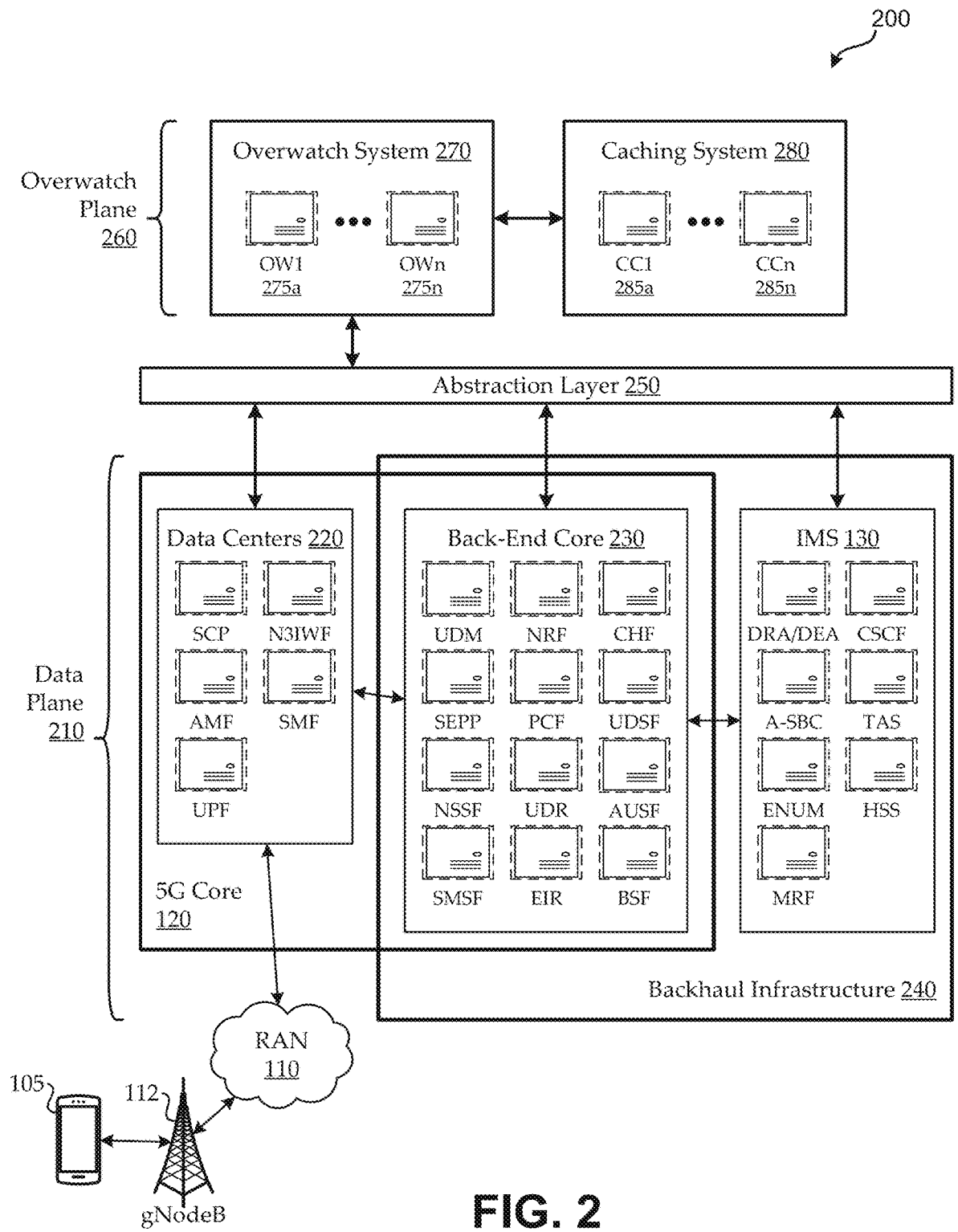
FIG. 2 shows another partial network architecture that includes a data plane and an overwatcher plane, according to various embodiments described herein.

FIG. 2 shows another partial network architecture 200 that includes a data plane 210 and an overwatcher plane 260, according to various embodiments described herein. As described above, a communication session generally establishes and maintains end-to-end connectivity between one or more UEs 105 and a data network via a set of participating NFs. As illustrated in FIG. 2, a UE 105 has access to the data plane 210 of a communication network via a gNodeB 112 and a RAN 110, and the data plane 210 implements the data network with a large number of NFs.

In the illustrated architecture, the data plane 210 includes a 5G core 120 and an IMS 130. The 5G core 120 includes certain NFs implemented in data centers 220, and other NFs implemented by a back-end core 230 in a backhaul infrastructure 240. The data centers 220 can include local data centers, edge data centers, enterprise data centers, regional data centers, and/or any other suitable data centers 220. As illustrated, the data centers 220 can include various NFs, such as AMFs, SMFs, UPFs, service communication proxies (SCPs) to facilitate cloud-native signaling for routing control and resiliency, non-3GPP interworking functions (N3IWFs) to facilitate routing messages outside the 5G RAN, etc. The back-end core 230 can include other core NFs, such as UDMs, NRFs, PCFs, NSSFs, AUSFs, SNSCs, EIRs, unified data repositories (UDRs) (i.e., master repositories used to store various types of data for use by other NFs), unstructured data storage function (UDSFs) to store dynamic state data and other unstructured data, charging and billing functions (CHFs), binding support functions (BSFs) to facilitate binding of application function requests to specific PCF instances, etc. The IMS 130 can include additional NFs, such as CSCFs, SBCs, HSSs, MRFs, diameter routing agents (DRAs) or diameter edge agents (DEAs) to facilitate diameter signaling control, telephony application servers (TASs) to facilitate telephony applications and related services, identifier and/or address mapping functions (e.g., ENUM, which is a standard for mapping the public telephone number address space to the Domain Name System address space), etc. The particular NFs shown in the data plane 210 and their particular architectural designations (e.g., the manner in which certain NFs are grouped) are intended only for the sake of illustration, and are not intended to limit the scope of embodiments described herein; features of the overwatcher plane 260 can operate on top of any suitable architecture of data plane 210, including any suitable set of NFs. For example, the HSS is described as an NF of the 5G core 120 in FIG. 1 and as part of the IMS 130 in FIG. 2; such assignments can be based on architectural conventions that do not practically impact the features of the overwatch plane 260 described herein.

The overwatch plane 260 can be separated from the data plane 210 by an abstraction layer 250. The abstraction layer 250 is designed to abstract certain details of the other layers to facilitate interoperability (e.g., including protocol compliance and/or independence, platform independence, etc.) with layers above and/or below. As described herein, features of the overwatch plane 260 can involve monitoring services of the data plane 210, detecting occurrences in the data plane 210, querying NFs in the data plane 210, receiving information from NFs in the data plane 210, etc. The abstraction layer 250 is configured to mediate between the types of service and/or data interfaces of the NFs in the data plane 210 and the service and/or data interfaces of components of the overwatch plane 260.

Embodiments of the overwatch plane 260 continuously monitor end-to-end communication session connectivity by monitoring the NFs of the data plane 210 (e.g., via the abstraction layer 250). As illustrated, the overwatch plane 260 includes an overwatch system 270 and a caching system 280. For an active communication session, the overwatch system 270 can determine critical session context datasets (CSCDs) that define the critical types of information (e.g., a minimum set of information) used by each particular type of NF to uniquely define the communication session. While the communication session remains active, embodiments of the overwatch system 270 can capture end-to-end context data to include the CSCD and endpoint information for each participating NF. For example, the overwatch plane 260 includes a number of instances of overwatchers 275. Each overwatcher 275 can be implemented as a network element on dedicated hardware, as a software instance running on dedicated hardware, as a virtualized function instantiated on a cloud infrastructure or other platform, etc.

The overwatchers 275 of the overwatch system 270 are in communication with compute caches 285 of the caching system 280. For example, each overwatcher 275 can be in communication with one or more compute caches 285, and/or each compute cache 285 can be in communication with one or more overwatchers 275. If there is a session failure, so that one or more failed NFs is reassigned to one or more replacement NFs, embodiments of the overwatch system 270 can recover the communication session by quickly recovering end-to-end context data from the compute caches 285 and restoring the end-to-end context data to any impacted NFs (e.g., by sending critical context data to replacement NFs, updating pointers and/or other information to inform connected NFs of relevant replacements, etc.). Such restoration can potentially allow the communication session to continue with full end-to-end connectivity through an updated set of participating NFs (e.g., excluding the failed NFs and including the replacement NFs), without dropping the communication session.

Figure 3:
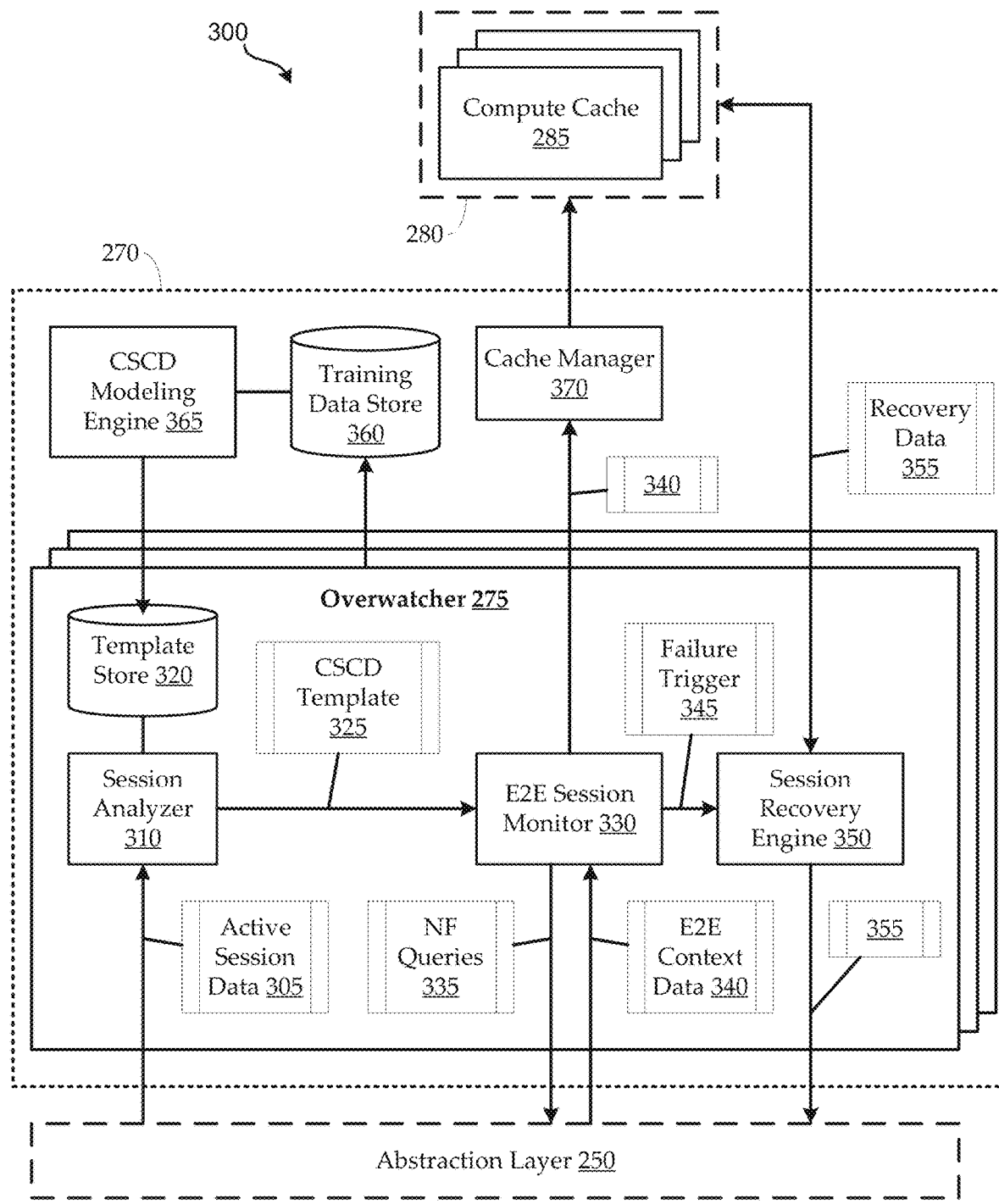
FIG. 3 shows a block diagram of an illustrative set of overwatchers of an overwatch system, according to various embodiments described herein.

FIG. 3 shows a block diagram 300 of an illustrative set of overwatchers 275 of an overwatch system 270, according to various embodiments described herein. For added clarity, the overwatch system 270 is illustrated in context of a set of compute caches 285 of a caching system 280 and in context of an abstraction layer 250, such as described with reference to FIG. 2. As illustrated, each overwatcher 275 can include a session analyzer 310, an end-to-end session monitor 330, and a session recovery engine 350. Embodiments of the session analyzer 310 can detect establishment of a communication session to effect end-to-end connectivity for one or more user devices (e.g., UEs 105) on a communication network (e.g., any suitable data network) via participating NFs. Along with the detection, the session analyzer 310 can receive active session data 305 that at least identifies the active communication session in a manner that is also used by participating NFs to identify the active communication session (e.g., a unique session identifier). For example, a UE 105 sends a PDU session establishment request with information, such as a preferred network slice identifier, a data network name, a unique PDU session identifier, a request type (e.g., whether the request is an initial request for a completely new PDU session, a handover request, etc.), information about the UE's session management capability, authorization information, protocol configuration information, etc. This information can be used by an AMF instance to determine how to establish the communication session. Some implementations of the session analyzer 310 can detect establishment of the communication session by detecting the PDU session request sent by the UE. Some other implementations of the session analyzer 310 can detect establishment of the communication session by detecting establishment of the PDU session by the AMF.

Embodiments of the session analyzer 310 can then analyze the detected active communication session to determine a critical session context dataset (CSCD) template 325. The CSCD template 325 can define, for each NF of the participating NFs, the respective CSCD by which that NF uniquely defines the communication session. As noted above, a set of participating NFs (i.e., a subset of the NFs of the communication network participating in a particular communication session) coordinate to provide end-to-end connectivity associated with a particular communication session. In effect, a set of network services and features provided by the participating NFs can be considered as logically stitched together to form the end-to-end connectivity. Performance of such services and features involves each participating NF locally generating and maintaining session context data, and each participating NF communicating certain information to others of the participating NFs. Each NF's generated and/or communicated session context data can include various types of mandatory and optional data, as defined at least by protocols (e.g., technical specifications).

Typically, a first portion of the session context data associated with (e.g., generated and/or maintained by) any particular NF can be considered to be the CSCD for the NF, including data determined to be critical to the particular type of NF being able to uniquely define each communication session for which it is one of the participating NFs. A second portion of the session context data associated with the particular NF can be obtainable from one or more other participating NFs based on the CSCD. For example, a particular AMF instance can maintain many items of session context data for each of the communication sessions for which it is a participating NF. A few of those items (e.g., six items of session context data) uniquely defines each particular communication session as CSCD for the AMF, while others of those items are easily retrievable from other participating NFs (e.g., by sending a query to the SMF, UDM, etc.); are non-critical, but maintained by the AMF to increase efficiency of the AMF; and/or are otherwise not part of the CSCD.

In effect, the CSCD template 325 determined for a particular communication session by the session analyzer 310 defines at least the minimum set of parameters to maintain from each type of participating NF in order to uniquely define the entire end-to-end connectivity for the particular communication session. Analyzing the active communication session to determine a CSCD template 325 can involve determining a session type for the active communication session, determining the set of participating NFs for the active communication session, and/or other determinations. For example, a communication session corresponding to a type of voice call initiated by a type of UE to another type of UE may involve a particular set of participating NFs that define such a communication session according to particular respective CSCDs; while a communication session corresponding to delivery of a type of text message by a type of UE to another type of UE may involve a partially different set of participating NFs that define such a communication session according to partially different, respective CSCDs. In some embodiments, each overwatcher 275 includes, or has access to, a template store 320. The template store 320 can include any suitable non-transient memory for storing multiple CSCD templates 325. In such embodiments, determining the CSCD template 325 by the session analyzer 310 involves selecting and retrieving an appropriate one of the multiple, stored CSCD templates 325 from the template store 320 based on identifying characteristics of the active communication session, such as a categorical session type (e.g., voice call, video call, SMS message, etc.).

Some embodiments of the overwatch system 270 can dynamically update definitions of CSCD templates 325 over time based on feedback from the network (e.g., from the overwatchers 275). Embodiments can include a training data store 360 coupled with a CSCD modeling engine 365. The training data store 360 can log CSCDs, information about detected active communication sessions, information about session failures, information relating to session recovery, and/or any other suitable information for use by the CSCD modeling engine 365 in determining whether and how to update CSCD templates 325. The training data store 360 can be implemented as a data lake, a data repository, and/or any suitable structured or unstructured storage. The CSCD modeling engine 365 can be implemented by any suitable AI algorithms, including any machine learning (ML), deep learning, and/or related techniques and algorithms. For example, the AI algorithms can include algorithms based on linear regression, logistic regression, linear discriminant analysis, decision trees, naive bayes, k-nearest neighbors, learning vector quantization, support vector machines, bagging and random forest, deep neural networks, and/or any other suitable algorithms. In general, such AI algorithms are trained to generate particular outputs from particular inputs by "learning" a function that provides precise correlation between those particular inputs and outputs. Algorithms of the CSCD modeling engine 365 can be designed to correlate between a particular CSCD template 325 definition (i.e., defined respective CSCDs for participating NFs), as monitored during a particular type of active communication session (e.g., according to a determined categorical session type), and successful recovery of such an active communication session after a session failure. Such algorithms can be trained based on initial training data and subsequent data obtained from active communication sessions in the training data store 360. For example, over time, CSCD templates 325 stored in the template store 320 can be updated (e.g., by changing which CSCDs are obtained for participating NFs) for improved session recovery, new CSCD templates 325 can be added to the template store 320 for newly detected types of sessions and/or newly detected types of NFs, etc.

Having determined a CSCD template 325 for the detected active communication session, embodiments of the end-to-end session monitor 330 can capture end-to-end context data 340 for the communication session while the communication session is active. As described above, the end-to-end connectivity is provided effectively by stitching together services and features of the participating NFs. Such stitching together results in an end-to-end session context that relies both on respective session context data being captured (e.g., generate, updated, maintained, etc.) by each participating NF, and on communications between each participating NF and one or more other participating NFs. As such, capturing the end-to-end context data 340 by the end-to-end session monitor 330 can involve continuously recording, from each NF of the participating NFs, the respective CSCD for the NF as defined by the CSCD template 325 and respective endpoint information for the NF. The respective endpoint information indicates with which others of the participating NFs the NF is communicating to effect the end-to-end connectivity of the active communication session. As used in this context, "continuously recording," or the like is intended to include any manner of snapshotting of the end-to-end context data 340 that ensures the end-to-end context data 340 is an up-to-date snapshot of all the respective CSCDs of all the participating NFs within practical limitations. For example, some implementations of the end-to-end session monitor 330 issue repeated NF queries 335 to the participating NFs (e.g., via the abstraction layer 250) for updates to their respective CSCDs, and receives updates to the end-to-end context data 340 in response to those NF queries 335; such a repeated request for updates and receipt of updates is considered herein to be "continuous." As another example, in some other implementations, updates to respective CSCDs by some or all participating NFs automatically triggers an update to the end-to-end context data 340 (e.g., via the abstraction layer 250), such that the end-to-end context data 340 as updates to CSCDs occur; such updating of end-to-end context data 340 responsive to updates to the CSCDs is considered herein to be "continuous."

As described with reference to FIG. 2, embodiments maintain the end-to-end context data 340 in the compute caches 285 of the caching system 280. In general, the compute caches 285 can be implemented as any fast data storage, such as a circular buffer. In general, the recorded end-to-end context data 340 for any particular active communication session is only useful while the session remains active (e.g., or until recorded in the training data store 360, if desirable). As such, the compute caches 285 can be configured to evict stale end-to-end context data 340, such as from communication sessions that are no longer active. Such eviction can be implemented in any suitable manner, such as by storing the end-to-end context data 340 in the compute caches 285 according to a first-in-first-out (FIFO) scheme, a last-in-first-out (LIFO) scheme, a least recently used (LRU) scheme, a most recently used (MRU) scheme, a least frequently used (LFU) scheme, a random replacement (RR) scheme, and/or any suitable cache eviction scheme.

Effective caching of the end-to-end context data 340 can rely on being able to satisfy certain considerations. One such consideration is that the overwatch system 270 may be continuously receiving large amounts of data from many NFs in the network. Even though the CSCD templates 325 can be defined, such that only a relatively small (i.e., critical) portion of the session context data is obtained for each active communication session, there may be very large numbers (e.g., thousands, millions, etc.) of active communication sessions on the network at any given time. As such, embodiments of the overwatch system 270 include a cache manager 370 to direct the manner in which the caching system 280 splits caching resources among the compute caches 285 to handle the large amounts of continually updating data in a fast and reliable manner.

In some embodiments, the cache manager 370 periodically performs health checks on the compute caches 285 of the caching system 280 to determine which of the compute caches 285 appear to be functioning properly when checked. For example, the cache manager 370 can communicate certain health check queries and listen for responses from the compute caches 285. Any compute caches 285 that fail to respond, or provide certain types of responses, can be deemed unhealthy; or any compute caches 285 that respond in an expected manner can be deemed healthy. The cache manager 370 can maintain a list of healthy compute caches 285, and it can use only those compute caches 285 deemed healthy according to the list for recording of end-to-end session monitor 330. For example, if a particular compute cache 285 is deemed unhealthy based on a health check result, the compute cache 285 can be removed from the list and is not used for further snapshots of end-to-end context data 340.

Embodiments of the cache manager 370 include features to handle rapid updates to, and/or large amounts of end-to-end context data 340 by effectively determining the manner of splitting caching services among the multiple compute caches 285. Such splitting of caching services can facilitate horizontal scaling. One such feature is that embodiments of the cache manager 370 determine and/or apply policies for directing which compute caches 285 (e.g., which of the presently healthy set of compute caches 285) are used at any time for storing snapshots of end-to-end context data 340. One implementation applies a "Least Response Time" policy to direct end-to-end context data 340 traffic to compute caches 285 presently have a lowest number of active connections and/or a least average response time. Another implementation applies a "Least Connection" policy to direct end-to-end context data 340 traffic to compute caches 285 presently having a smallest number of connections (e.g., where large numbers of connections are unevenly distributed across compute caches 285). Another implementation applies a "Least Bandwidth" policy to direct end-to-end context data 340 traffic to compute caches 285 presently having a least amount of overall traffic, or a least amount of end-to-end context data 340 traffic. Another implementation applies a "Round Robin" policy to direct end-to-end context data 340 traffic to a next compute cache 285 in a cycle. Another implementation applies a "Weighted Round Robin" policy to direct end-to-end context data 340 traffic to a next compute cache 285 in a cycle, but weighted based on present characteristics of the compute caches 285, such as capacity, bandwidth, throughput, etc. In some implementations, the above and/or other policies, and performance of health checks and/or other predictive analytics, can be used to predict bottlenecks before they occur; end-to-end context data 340 traffic can automatically be re-routed to avoid such bottlenecks.

Another feature of embodiments of the cache manager 370 is partitioning of the end-to-end context data 340 among the multiple compute caches 285. Such partitioning can improve manageability, performance, availability, disaster recovery, and/or provide other features. Some implementations horizontally partition the end-to-end context data 340 by active communication session. In some implementations, an active communication session with a large amount of end-to-end context data 340 can further be vertically partitioned. Some embodiments partition end-to-end context data 340 by distributing different active communication sessions to different compute caches 285. For example, a table of active communication sessions is maintained by the cache manager 370 (or any other suitable component of the overwatch system 270), where each row of the table stores the end-to-end context data 340 for a particular active communication session; each row of the table can be assigned to one of the compute caches 285, thereby horizontally partitioning the end-to-end context data 340. Other embodiments apply more complex partitioning schemes, such as for added redundancy, reliability, etc. For example, embodiments apply key-based, or hash-based partitioning by algorithmically generating a key (e.g., using a hash function) from some number of predetermined attributes of the end-to-end context data 340, and distributing the end-to-end context data 340 to compute caches 285 in accordance with the generated key. Some such embodiments apply consistent hashing to minimize the impact of one or more of the compute caches 285 failing the health check, or otherwise becoming unavailable. Such consistent hashing essentially maps the compute caches 285 to a ring (e.g., a unit circle), and assigns each next set of end-to-end context data 340 (e.g., each new snapshot coming from the end-to-end session monitor 330) to a next compute cache 285 in the ring (e.g., in a clockwise order); if one of the compute caches 285 needs to be removed from the ring (e.g., because it failed a health check), the data assigned to that removed compute cache 285 is simply reassigned to a next compute cache 285 in the ring without having to reassign all the data for all the compute caches 285.

Based on the above, end-to-end context data 340 is continuously being updated and maintained in the caching system 280. At any moment, one or more participating NFs can fail, causing one or more active communication sessions to fail. For example, a particular virtualized instance of a particular NF may crash, an entire regional data center may go offline, etc., and end-to-end connectivity for one or more impacted active communication sessions can be interrupted. When such a failure occurs, a failure trigger 345 can be generated. In some embodiments, the end-to-end session monitor 330 detects such a failure and generates the failure trigger 345. For example, protocols for modern communication networks typically define how the network will find a replacement NF when an NF fails. For the sake of illustration, suppose that an instance of an AMF participating in an active communication session goes down. Protocols (e.g., 3GPP technical specifications) can dictate that a new AMF is automatically selected. For example, the gNodeB can follow 3GPP defined procedures (e.g., in TS 23.501) to select a new AMF via certain core plane (CP) NFs, via a service communication proxy (SCP), via a default AMF selection, or via other suitable manners of yielding a replacement AMF instance. Some implementations of the end-to-end session monitor 330 can detect the selection of the replacement NF instance (e.g., or any other related communications between NFs of the network) and can generate the failure trigger 345 in response to that detection.

As noted above, in some cases, the replacement AMF can obtain session context information from the database of the failed AMF, or can otherwise recover certain information to maintain the active communication session. However, conventionally, there are some cases in which the session context information is lost in a practically unrecoverable manner, such that the active communication session is dropped. Embodiments of the overwatch system 270 include the session recovery engine 350 to detect the session failure (e.g., by detecting the failure trigger 345) and automatically to take remedial action in accordance with the most up-to-date end-to-end context data 340 maintained by the caching system 280. It can be assumed that the session failure involves at least one of the participating NFs failing, and the at least one failed NFs being reassigned to a corresponding at least one replacement NF (i.e., not previously part of the participating NFs). As one example, the session failure involves failure of an instance of an AMF, and the network automatically seeks to reassign the active communication session to a replacement instance of an AMF that was not previously in the set of participating NFs. As another example, a data center (e.g., one or more data centers 220 of FIG. 2) goes down, causing instances of AMFs, SMFs, UPFs, SCPs, N3IWFs, and/or other NFs concurrently to fail; and the network automatically seeks to reassign many active communication sessions to replacement instances of all those failed NFs.

Having detected the session failure, embodiments of the session recovery engine 350 seek to recover (i.e., maintain end-to-end connectivity for) the impacted active communication session by providing the one or more replacement NFs with recovery data 355 generated from the end-to-end context data 340. In some embodiments, the session recovery engine 350 generates the recovery data 355 from the end-to-end context data 340 to provide, to each of the one or more replacement NFs, the respective CSCDs for the corresponding one or more failed NFs and the respective endpoint information for the corresponding one or more failed NFs. Some such embodiments of the session recovery engine 350 can identify an impacted set of NFs as any of the participating NFs detected to have failed (e.g., or detected to have been replaced by protocol) and any of the participating NFs included in the endpoint information for any of the failed NFs. In such embodiments, the session recovery engine 350 can generate the recovery data 355 from the end-to-end context data 340 in a manner that: for all replacement NFs (i.e., replacement instances of NFs that failed, such that the replacement NFs initially have no previous context data for active communication session being restored), restores respective CSCDs based on the stored end-to-end context data 340 in the caching system 280; and for all other impacted NFs (i.e., those participating NFs that did not fail, but were receiving communications from, sending communications to, and/or otherwise impacted by the identification, location, and/or operation of one of the failed NFs), updating any session context data and/or endpoint information to indicate the reassignment to the replacement NFs (e.g., updating pointers or links to point to the appropriate replacement NF instances).

Notably, the end-to-end context data 340 is not a snapshot of the full state of an NF, such that the recovery data 355 simply restores a last known state to a replacement instance. Rather, the end-to-end context data 340 includes the CSCDs for each participating NF and the endpoint information for each participating NF, to effectively capture a critical set of data needed to stitch together the entire end-to-end session connectivity. As such, the recovery data 355 is generated to provide replacement NFs (and other participating NFs, where needed) with critical information needed to quickly recover from the failure and maintain the end-to-end session connectivity. For example, because the CSCD for a particular NF only includes a portion of the session context data it would normally maintain in connection with an active communication session, the recovery data 355 is also only a portion of the session context data that the replacement NF will maintain in connection with the active communication session. However, each respective CSCD is defined for its corresponding NF in accordance with predetermined protocols (e.g., technical specifications, policies, etc.), so that providing the respective CSCD provides the corresponding NF with enough session context information both to be able to rapidly take-over for the corresponding failed NF in providing end-to-end connectivity, and to be able to automatically locate and obtain any missing session context information (not part of the CSCD) from other participating NFs. For example, in the 5G context, multiple types of NFs can periodically send certain information to the UDM referenced by a subscriber ID, and the UDM can provide those NFs with a path indicating where the sent information is being maintained. The recovery data 355 can be generated to provide, say a failed AMF, with enough information (e.g., a subscriber identifier and associated UDM path associated with the active communication session) to be able to accurately query the UDM for relevant information previously sent to the UDM by the now-failed AMF instance. Thus, even in types of session failures that would conventionally cause communication sessions to be dropped, the recovery data 355 can be generated and provided to the participating NFs (including the replacement NFs after the session failure) in a manner that quickly restores full end-to-end session connectivity and allows the communication session to remain active with a continuity of session context.

Figure 4:
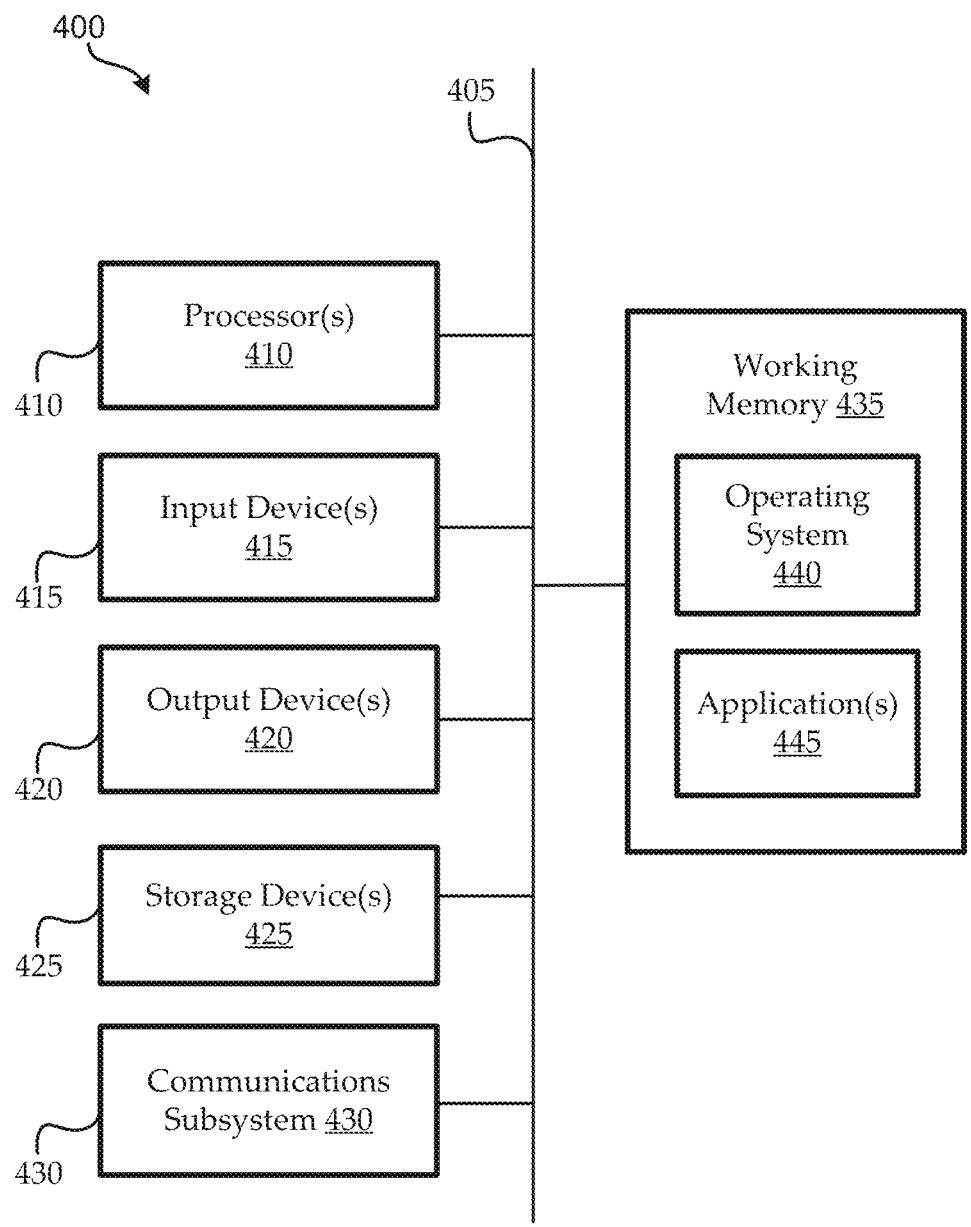
FIG. 4 provides a schematic illustration of one embodiment of a computer system that can implement various system components and/or perform various steps of methods provided by various embodiments.

Embodiments of the overwatch system 270, or components thereof (e.g., overwatchers 275), can be implemented on, and/or can incorporate, one or more computer systems, as illustrated in FIG. 4. FIG. 4 provides a schematic illustration of one embodiment of a computer system 400 that can implement various system components and/or perform various steps of methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown including hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like). As illustrated, some embodiments include one or more input devices 415 and/or output devices 420 for human user input/output interactions. For example, input devices 415 can include, without limitation, buttons, knobs, switches, keypads, touchscreens, remote controls, and/or the like; and output devices 420 can include, without limitation, displays, indicators, gauges, and/or the like. As described herein, the computer system 400 is configured to interface with additional computers, such that the input devices 415 and/or output devices 420 include various physical and/or logical interfaces (e.g., ports, etc.) to facilitate computer-to-computer interaction and control.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 425 include the non-transient memory 240. In some embodiments, the storage devices 425 can include data storages referenced herein, such as the template store 320 and/or the training data store 360. In some embodiments, some or all compute caches 285 of the caching system 280 can also be implemented as part of the storage devices 425.

The computer system 400 can also include a communications subsystem 430, which can include, without limitation, any suitable antennas, transceivers, modems, network cards (wireless or wired), infrared communication devices, wireless communication devices, chipsets (such as a Bluetooth™ device, an 802.11 device, a WiFi device, a WiMax device, cellular communication device, etc.), and/or other communication components. As illustrated, the communications subsystem 430 generally includes any suitable components for facilitating communications with network functions of the data plane of a communications network and/or an abstraction layer 250. In some embodiments, the caching system 280 is separate from the computer system 400, and the communications subsystem 430 can further facilitate communications with the caching system 280.

In many embodiments, the computer system 400 will further include a working memory 435, which can include a RAM or ROM device, as described herein. The computer system 400 also can include software elements, shown as currently being located within the working memory 435, including an operating system 440, device drivers, executable libraries, and/or other code, such as one or more application programs 445, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

In some embodiments, the operating system 440 and the working memory 435 are used in conjunction with the one or more processors 410 to implement features of the overwatch system 270. In such embodiments, the working memory 435 includes non-transient, processor-readable memory having instructions stored thereon, which, when executed, cause the one or more processors 410 to perform services (e.g., features, functions, etc.) of the overwatchers 275 (e.g., the session analyzer 310, the end-to-end session monitor 330, and/or the session recovery engine 350), the CSCD modeling engine 365, and/or the cache manager 370. A set of these instructions and/or codes can be stored on a non-transitory computer-readable storage medium, such as the non-transitory storage device(s) 425 described above. In some cases, the storage medium can be incorporated within a computer system, such as computer system 400. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 400 and/or can take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which can be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 can cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media can be involved in providing instructions/code to processor(s) 410 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 400. The communications subsystem 430 (and/or components thereof) generally will receive signals, and the bus 405 then can carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. For example, each overwatcher 275 can be implemented as a virtual machine instance running on one or more computational platforms in one or more locations.

Figure 5:
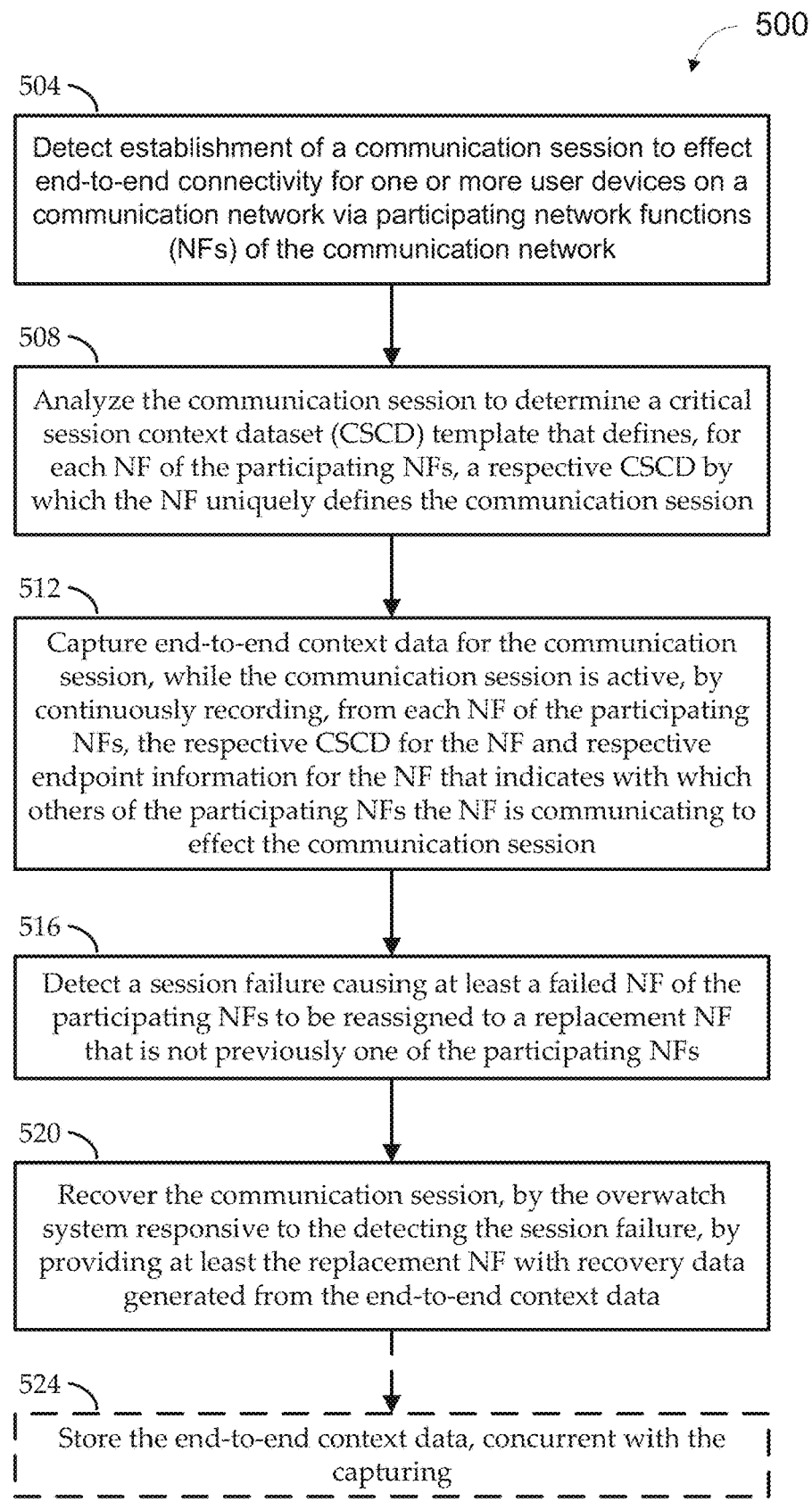
FIG. 5 shows a flow diagram of an illustrative method for rapid recovery of session failures in a communication network, according to various embodiments.

FIG. 5 shows a flow diagram of an illustrative method 500 for rapid recovery of session failures in a communication network, according to various embodiments. The method 500 can be implemented using any suitable system, including those described above in FIGS. 2-4. Embodiments of the method 500 begin at stage 504 by detecting (e.g., by an overwatch system) establishment of a communication session to effect end-to-end connectivity for one or more user devices on a communication network via participating network functions (NFs) of the communication network.

At stage 508, embodiments can analyze the communication session (e.g., by the overwatch system) to determine a critical session context dataset (CSCD) template that defines, for each NF of the participating NFs, a respective CSCD by which the NF uniquely defines the communication session. In some embodiments, the CSCD template defines the respective CSCD for each NF categorically based on an NF type associated with the NF, and the failed NF and the replacement NF are associated with a same NF type. In some embodiments, each of the participating NFs has an associated contribution to effecting the end-to-end connectivity in accordance with a set of protocol-defined standards for the communication session, and the CSCD template defines the respective CSCD for each of the participating NFs based on the set of protocol-defined standards for the communication session. At stage 512, embodiments can capture end-to-end context data for the communication session (e.g., by the overwatch system), while the communication session is active, by continuously recording, from each NF of the participating NFs, the respective CSCD for the NF and respective endpoint information for the NF that indicates with which others of the participating NFs the NF is communicating to effect the communication session.

At stage 516, embodiments can detect a session failure causing at least a failed NF of the participating NFs to be reassigned to a replacement NF that is not previously one of the participating NFs. At stage 520, embodiments can recover the communication session, by the overwatch system responsive to the detecting the session failure, by providing at least the replacement NF with recovery data generated from the end-to-end context data. In some embodiments, the recovering at stage 520 includes generating the recovery data from the end-to-end context data to provide, to the replacement NF, the respective CSCD for the failed NF and the respective endpoint information for the failed NF. In some such embodiments, the recovering at stage 520 further includes: identifying an impacted set of NFs of the participating NFs as those identified by the respective endpoint information for the failed NF; and generating the recovery data from the end-to-end context data further to update the end-to-end context data for at least the impacted set of NFs to indicate the reassignment to the replacement NF.

In some embodiments, at stage 524, the method 500 can store the end-to-end context data, concurrent with the capturing (e.g., in a caching system coupled with the overwatch system). In such embodiments, the recovering at stage 520 can include obtaining the end-to-end context data from the caching system. In some implementations, the caching system includes multiple caches (e.g., compute caches), and the storing at stage 524 includes periodically health-checking the caches to determine a presently healthy set of caches and storing the end-to-end context data, concurrent with the capturing, in the presently healthy set of caches. In some embodiments, at a time of the detecting, the communication session is one of many communication sessions active on the communication network, each having respective end-to-end context data being captured by the overwatch system; and the storing at stage 524 includes horizontally partitioning the respective end-to-end context data for the communication sessions across multiple caches of the caching system.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for rapid recovery of session failures in a communication network, the system comprising:
   an overwatch system implemented in an overwatch plane of a communication network and comprising:
   a session analyzer to:
      detect establishment of a communication session to effect end-to-end connectivity for one or more user devices on the communication network via participating network functions (NFs) of the communication network; and
      analyze the communication session to determine a critical session context dataset (CSCD) template that defines, for each NF of the participating NFs, a respective CSCD by which the NF uniquely defines the communication session;
   an end-to-end session monitor coupled with the session analyzer to capture end-to-end context data for the communication session, while the communication session is active, by continuously recording, from each NF of the participating NFs, the respective CSCD for the NF and respective endpoint information for the NF that indicates with which others of the participating NFs the NF is communicating to effect the communication session; and a session recovery engine to:
    detect a session failure causing at least a failed NF of the participating NFs to be reassigned to a replacement NF that is not previously one of the participating NFs; and
    recover the communication session, responsive to the detecting the session failure, by providing at least the replacement NF with recovery data generated from the end-to-end context data.

2. The system of claim 1, further comprising:
a caching system coupled with the overwatch system in the overwatch plane to store the end-to-end context data, concurrent with the capturing by the end-to-end session monitor,
wherein the session recovery engine is to recover the communication session by obtaining the end-to-end context data from the caching system.

3. The system of claim 2, wherein:
the caching system comprises a plurality of caches; and
the caching system is to store the end-to-end context data by:
    periodically health-checking the plurality of caches to determine a presently healthy set of caches; and
    storing the end-to-end context data, concurrent with the capturing by the end-to-end session monitor, in one of the presently healthy set of caches.

4. The system of claim 2, wherein:
at a time of the session analyzer detecting the establishment of the communication session, the communication session is one of a plurality of communication sessions active on the communication network, each having respective end-to-end context data being captured by one or more instances of the end-to-end session monitor; and
the caching system is to store the end-to-end context data by horizontally partitioning the respective end-to-end context data for the plurality of communication sessions across a plurality of caches of the caching system.

5. The system of claim 4, wherein:
the caching system is to store the end-to-end context data by applying consistent hashing to the respective end-to-end context data for the plurality of communication sessions to horizontally partition the respective end-to-end context data across the plurality of caches of the caching system.

6. The system of claim 1, wherein the session recovery engine is to recover the communication session by generating the recovery data from the end-to-end context data to provide, to the replacement NF, the respective CSCD for the failed NF and the respective endpoint information for the failed NF.

7. The system of claim 6, wherein the session recovery engine is to recover the communication session further by:
    identifying an impacted set of NFs of the participating NFs as those identified by the respective endpoint information for the failed NF; and
    generating the recovery data from the end-to-end context data further to update the end-to-end context data for at least the impacted set of NFs to indicate the reassignment to the replacement NF.

8. The system of claim 1, wherein the overwatch system further comprises:
    a template store to store a plurality of CSCD templates comprising at least one respective CSCD definition for each of a plurality of NF types, the CSCD template being one of the plurality of CSCD templates that defines the respective CSCD for each NF categorically based on which NF type of the plurality of NF types is associated with the NF.

9. The system of claim 8, wherein:
each NF type of each of the participating NFs has an associated contribution to effecting the end-to-end connectivity in accordance with a set of protocol-defined standards for the communication session; and
the CSCD template defines the respective CSCD for each of the participating NFs categorically based on the associated contribution of the NF type of the NF and the set of protocol-defined standards for the communication session.

10. The system of claim 8, wherein:
the failed NF and the replacement NF are associated with a same NF type.

11. The system of claim 1, wherein:
the overwatch system is in an overwatch plane of the communication network;
the participating NFs are in a data plane of the communication network that is logically separated from the overwatch plane by an abstraction layer.

12. A method for rapid recovery of session failures in a communication network, the method comprising:
    detecting, by an overwatch system, establishment of a communication session to effect end-to-end connectivity for one or more user devices on a communication network via participating network functions (NFs) of the communication network;
    analyzing the communication session, by the overwatch system, to determine a critical session context dataset (CSCD) template that defines, for each NF of the participating NFs, a respective CSCD by which the NF uniquely defines the communication session;
    capturing end-to-end context data for the communication session, by the overwatch system while the communication session is active, by continuously recording, from each NF of the participating NFs, the respective CSCD for the NF and respective endpoint information for the NF that indicates with which others of the participating NFs the NF is communicating to effect the communication session;
    detecting a session failure causing at least a failed NF of the participating NFs to be reassigned to a replacement NF that is not previously one of the participating NFs; and
    recovering the communication session, by the overwatch system responsive to the detecting the session failure, by providing at least the replacement NF with recovery data generated from the end-to-end context data.

13. The method of claim 12, further comprising:
storing the end-to-end context data, concurrent with the capturing, in a caching system coupled with the overwatch system,
wherein the recovering comprises obtaining the end-to-end context data from the caching system.

14. The method of claim 13, wherein:
the caching system comprises a plurality of caches; and
the storing comprises:
    periodically health-checking the plurality of caches to determine a presently healthy set of caches; and
    storing the end-to-end context data, concurrent with the capturing, in one of the presently healthy set of caches.

15. The method of claim 13, wherein:
at a time of the detecting, the communication session is one of a plurality of communication sessions active on the communication network, each having respective end-to-end context data being captured by the overwatch system; and the storing comprises horizontally partitioning the respective end-to-end context data for the plurality of communication sessions across a plurality of caches of the caching system.

16. The method of claim 12, wherein the recovering comprises generating the recovery data from the end-to-end context data to provide, to the replacement NF, the respective CSCD for the failed NF and the respective endpoint information for the failed NF.

17. The method of claim 16, wherein the recovering further comprises:
    identifying an impacted set of NFs of the participating NFs as those identified by the respective endpoint information for the failed NF; and
    generating the recovery data from the end-to-end context data further to update the end-to-end context data for at least the impacted set of NFs to indicate the reassignment to the replacement NF.

18. The method of claim 12, wherein:
    the CSCD template defines the respective CSCD for each NF categorically based on an NF type associated with the NF; and
    the failed NF and the replacement NF are associated with a same NF type.

19. The method of claim 12, wherein:
    each of the participating NFs has an associated contribution to effecting the end-to-end connectivity in accordance with a set of protocol-defined standards for the communication session; and
    the CSCD template defines the respective CSCD for each of the participating NFs based on the set of protocol-defined standards for the communication session.

20. The method of claim 12, wherein:
    the overwatch system is in an overwatch plane of the communication network;
    the participating NFs are in a data plane of the communication network that is logically separated from the overwatch plane by an abstraction layer.

* * * * *